Feb. 5, 1924.
W. BARRY
MAIL DISTRIBUTING APPARATUS
Original Filed Aug. 13, 1912  9 Sheets-Sheet 5

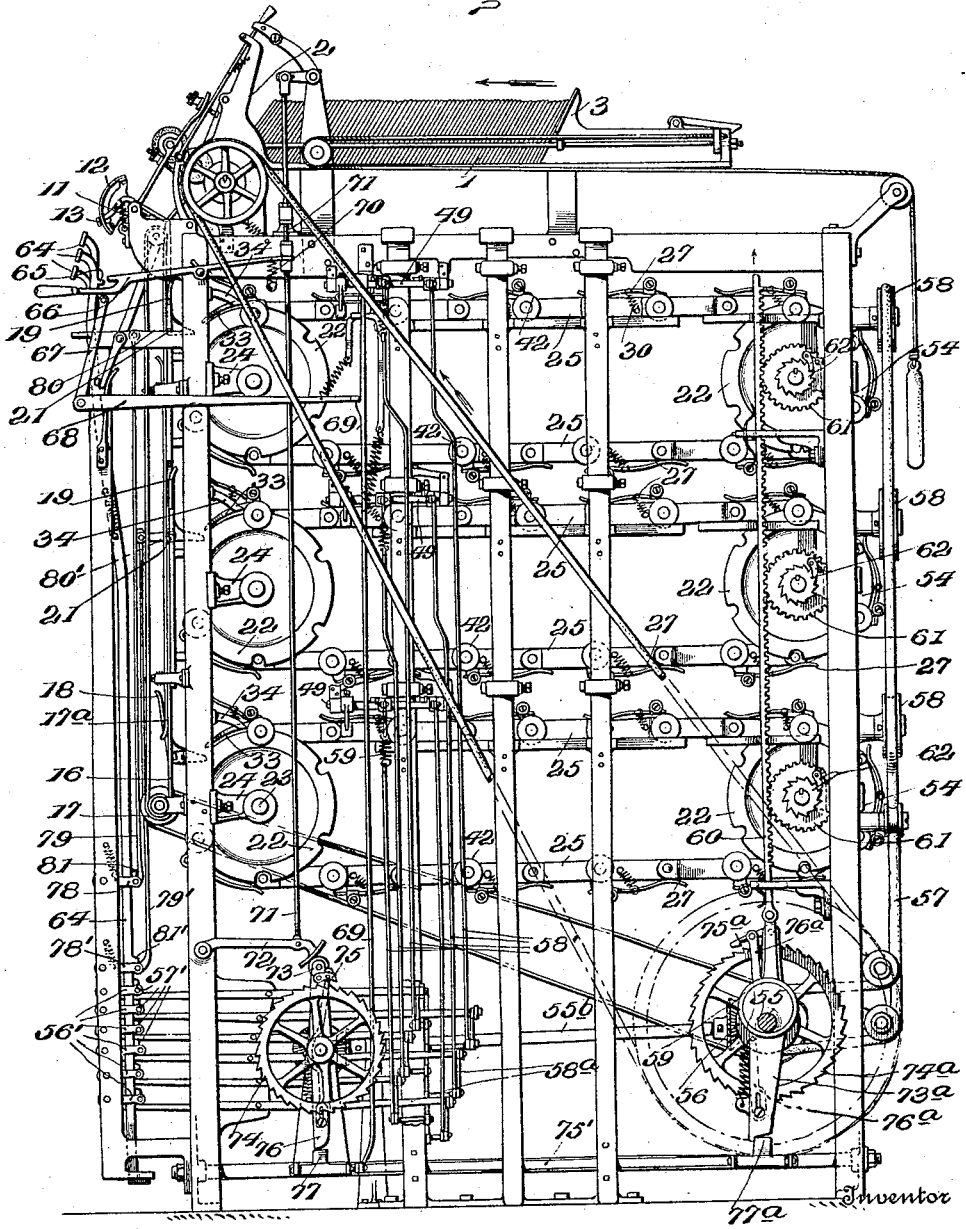

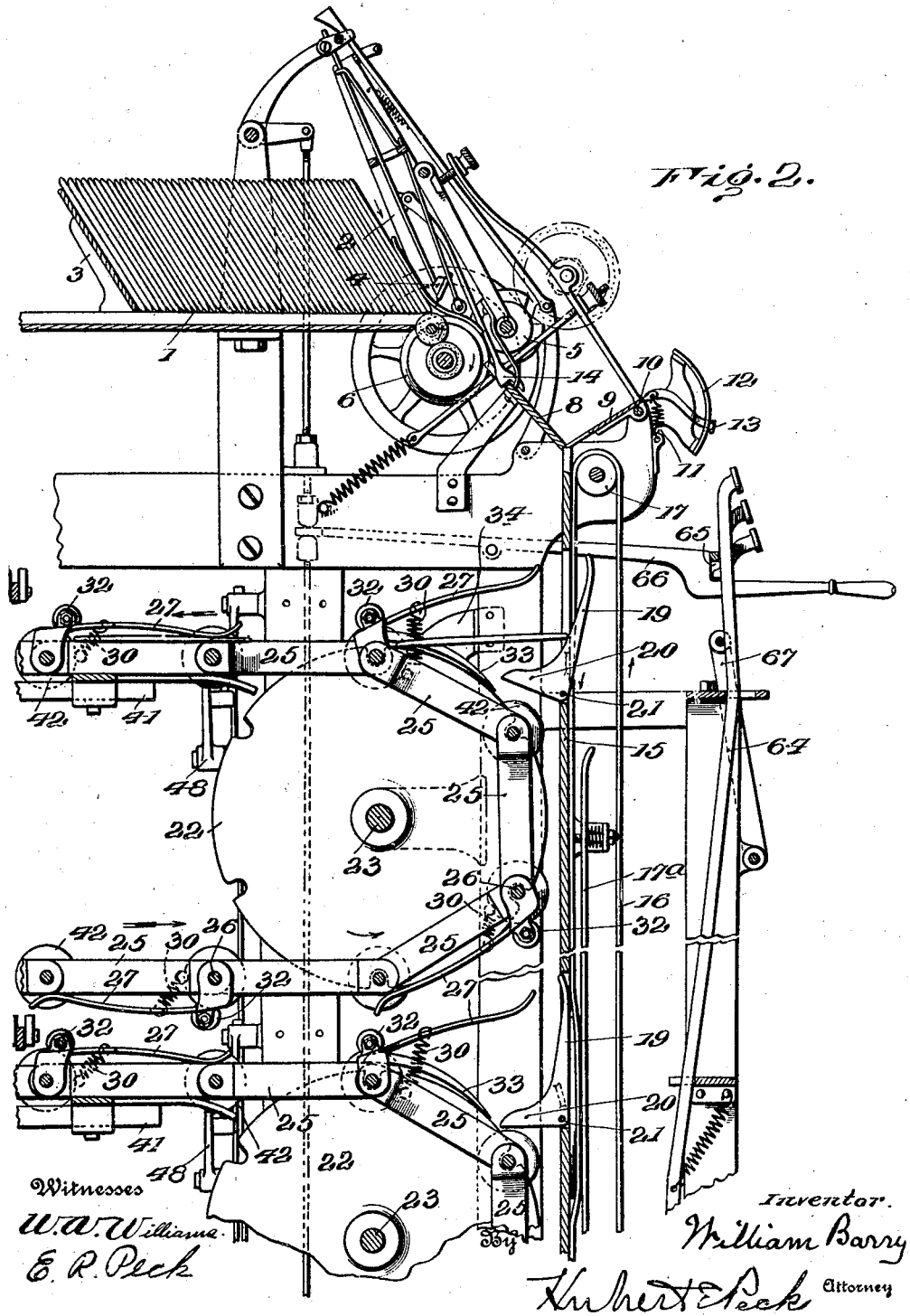

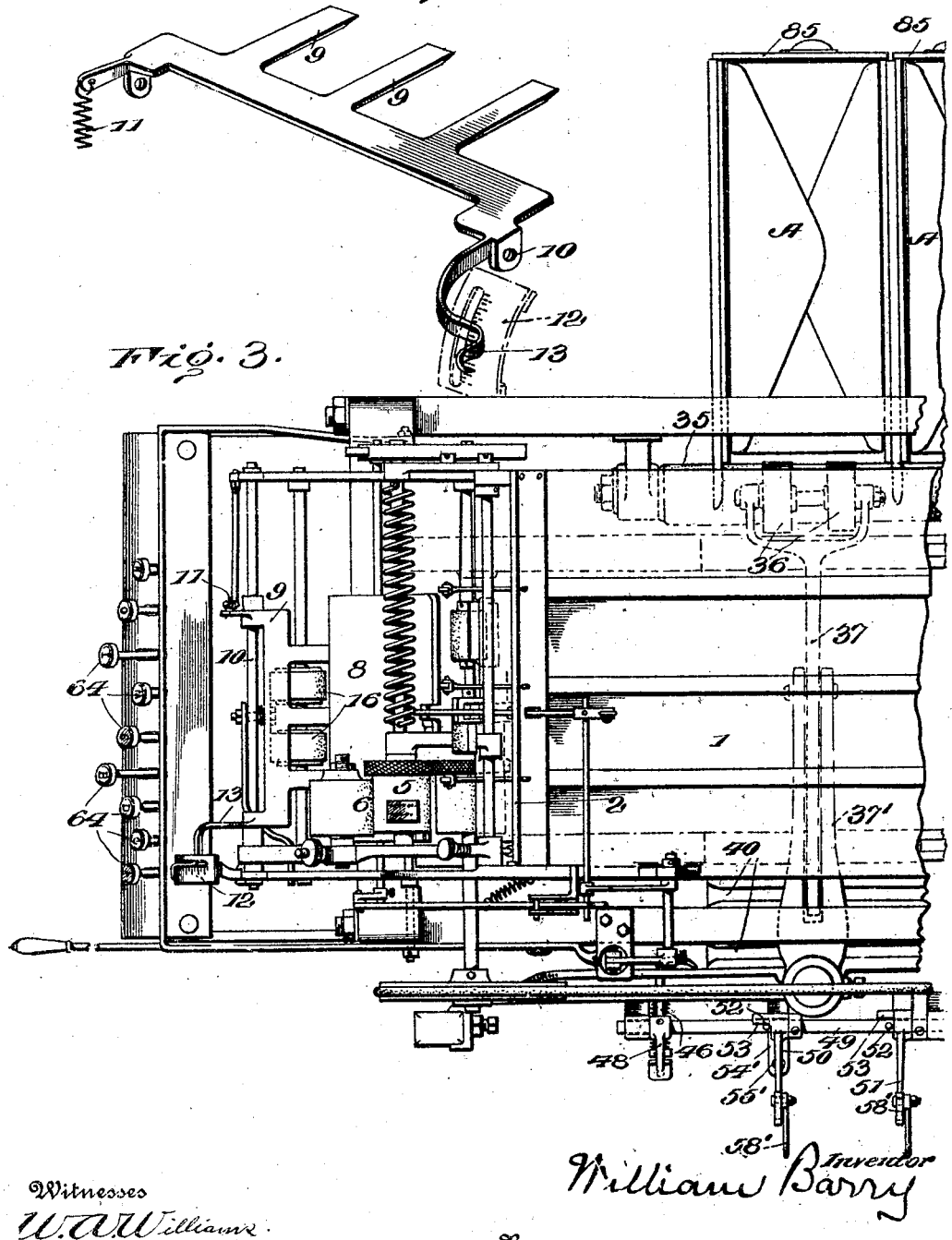

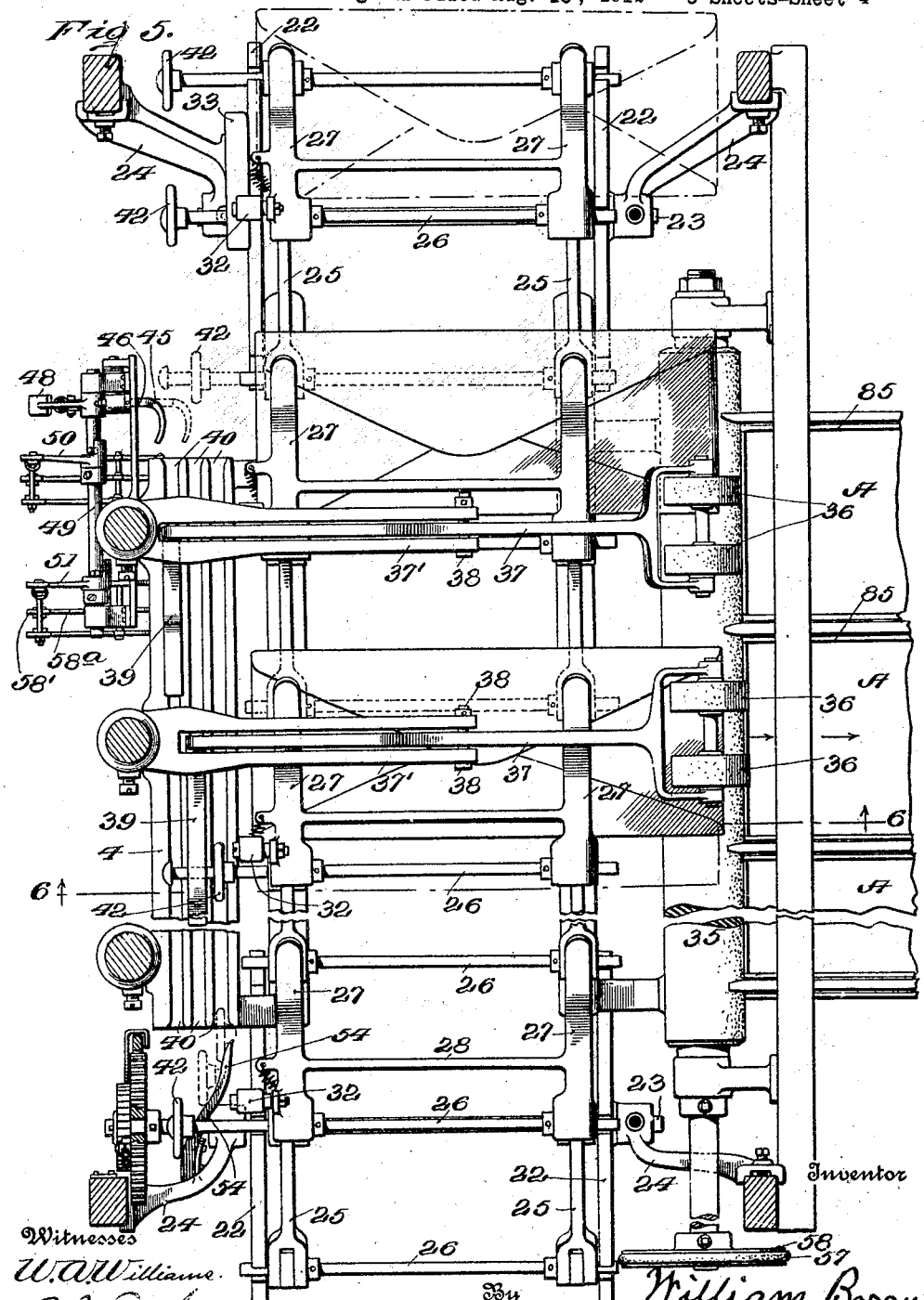

1,482,834

Feb. 5, 1924. 1,482,834
W. BARRY
MAIL DISTRIBUTING APPARATUS
Original Filed Aug. 13, 1912    9 Sheets Sheet 6
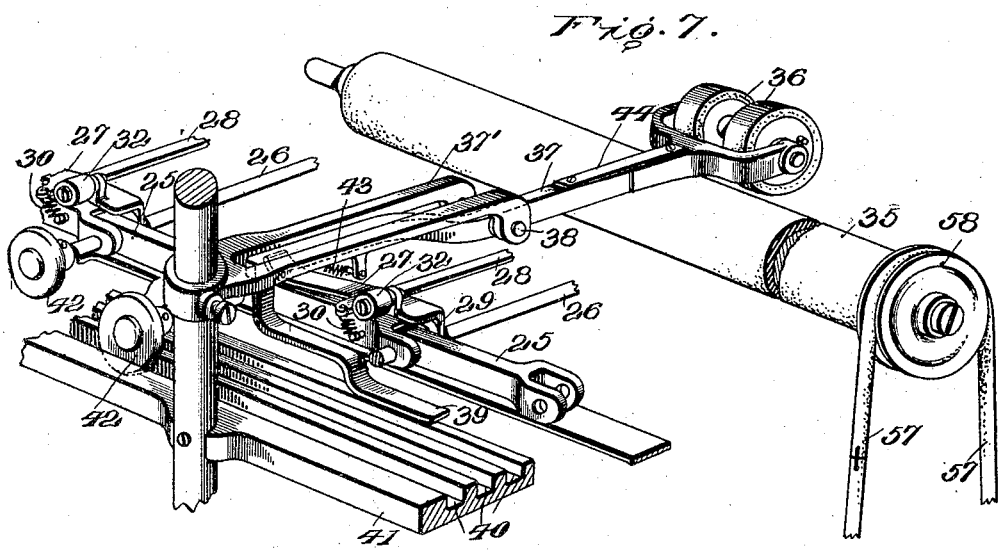
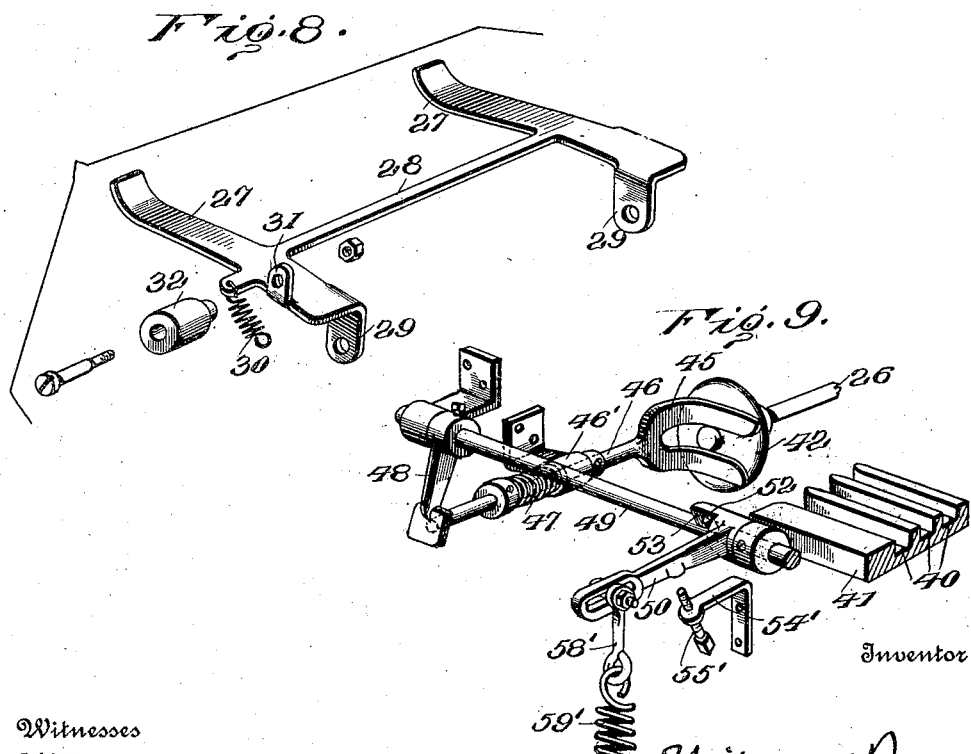
Witnesses
W.A.Williams
E.R. Peck
Inventor
William Barry
By Hubert Peck Attorney

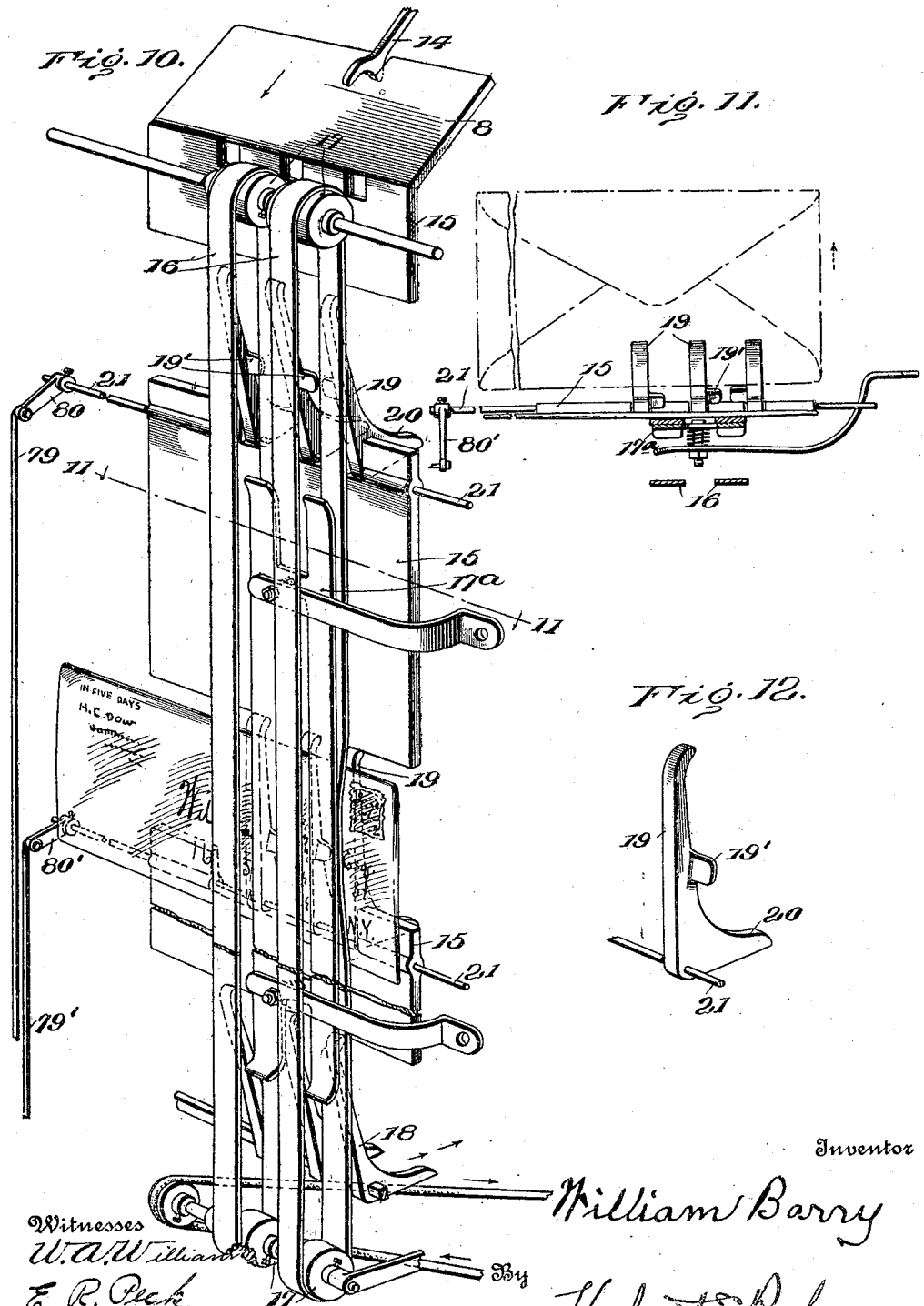

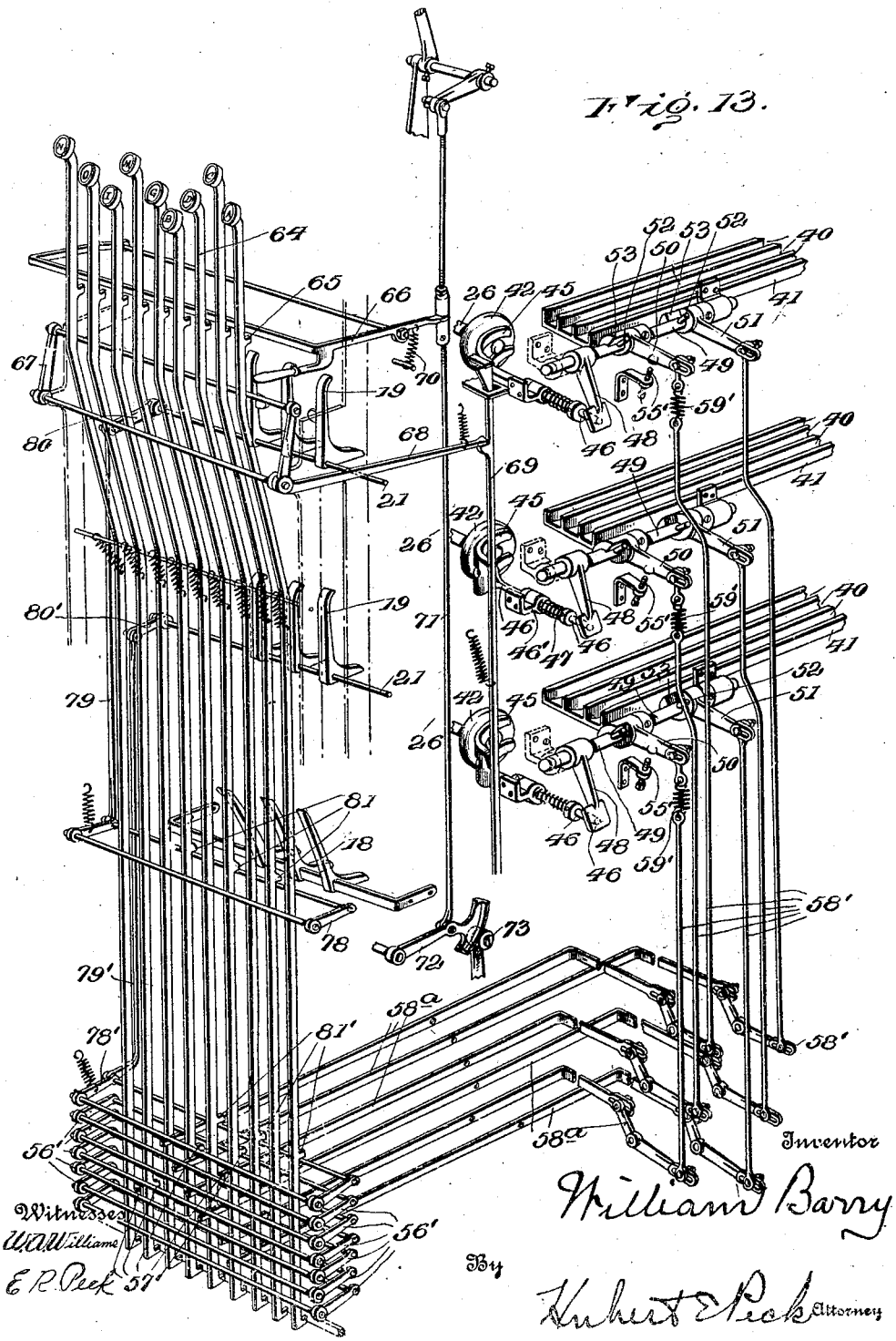

Feb. 5, 1924.                                    1,482,834
                   W. BARRY
            MAIL DISTRIBUTING APPARATUS
        Original Filed Aug. 13, 1912   9 Sheets-Sheet 9
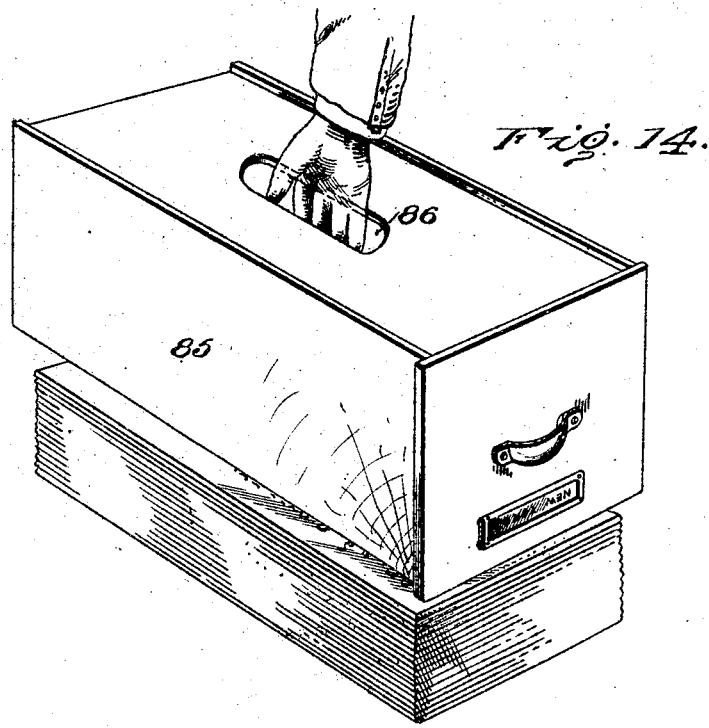

Patented Feb. 5, 1924.

1,482,834

UNITED STATES PATENT OFFICE.

WILLIAM BARRY, OF OSWEGO, NEW YORK, ASSIGNOR TO THE AUTO MAIL DISTRIBUTER, INC., OF SYRACUSE, NEW YORK, A CORPORATION OF NEW YORK.

MAIL-DISTRIBUTING APPARATUS.

Application filed August 13, 1912, Serial No. 714,923. Renewed June 16, 1922. Serial No. 568,821.

*To all whom it may concern:*

Be it known that I, WILLIAM BARRY, a citizen of the United States, residing at Oswego, in the county of Oswego and State of New York, have invented certain new and useful Improvements in Mail-Distributing Apparatus, of which the following is a specification.

This invention relates to certain improvements in mail distributing apparatus; and the objects and nature of the invention will be readily understood by those skilled in the art in the light of the following explanation of the accompanying drawings illustrating what I now believe to be the preferred embodiment from among other constructions, combinations and arrangements within the spirit and scope of my invention.

My present invention relates generally to improvements in mail distributing apparatus, such for instance, as disclosed by my U. S. Patent No. 919,810, dated April 27 1909, and among other features contemplates the provision of conveying devices to which the letters are successively delivered for distribution irrespective of the order of delivery of the letters to the boxes so that said devices may simultaneously carry a plurality of letters and distribute the same entirely without regard to the order in which the letters are delivered to said devices, as distinguished from the particular apparatus of said patent wherein the letters are distributed successively, as each letter is distributed to a box before the succeeding letter is started on its passage from the inspection station.

A further object of the invention is to provide a mail distributing apparatus embodying devices for distributing the letters to the boxes comprising conveyers having a step bp step movement and adapted to simultaneously carry a plurality of letters in connection with means to positively remove the letters from such conveyers and deliver the same to previously designated boxes when the letters arrive opposite the respective boxes to which they are predestined.

A further object of the invention is to provide mail distributing apparatus wherein the mechanism for conveying and distributing the letters to the boxes is arranged at one side of the case of boxes for instance, at the rear side of the case, and not between the rows of boxes of the cases whereby the rows of boxes can be arranged a minimum distance apart.

A further object of the invention is to provide mail distributing apparatus embodying superimposed rows of letter boxes and superimposed endless letter conveyers coresponding to said rows and comprising letter clamps, each conveyer movable step by step to bring its letter clamps successively into operative position with respect to the boxes of the row to which said conveyer corresponds, and being provided with means to snatch the letters from the clamps and deliver the same to predetermined boxes.

A further object of the invention is to provide means for snatching the letters from the step by step movable letter conveying clamps and delivering the same to predetermined boxes and means for predetermining the boxes to which the letters are to be delivered.

A further object of the invention is to provide means for indicating the approximate weight of each letter delivered at the inspection station of mail distributing apparatus.

A further object of the invention is to provide certain improvements in combinations and arrangements of parts for the production of an exceedingly efficient improved mail distributing apparatus.

The invention consists in certain novel features in construction and in combinations and arrangements as more fully and particularly set forth and specified hereinafter.

Referring to the accompanying drawings:—

Fig. 1, is a side elevation of apparatus embodying my present invention.

Fig. 2, is a detail vertical sectional view of the front upper portion of the apparatus.

Fig. 3, is a detail top plan view showing a portion of the apparatus.

Fig. 4, is a perspective view of a detail of the apparatus.

Fig. 5, is a detail horizontal section on an enlarged scale.

Figure 6:
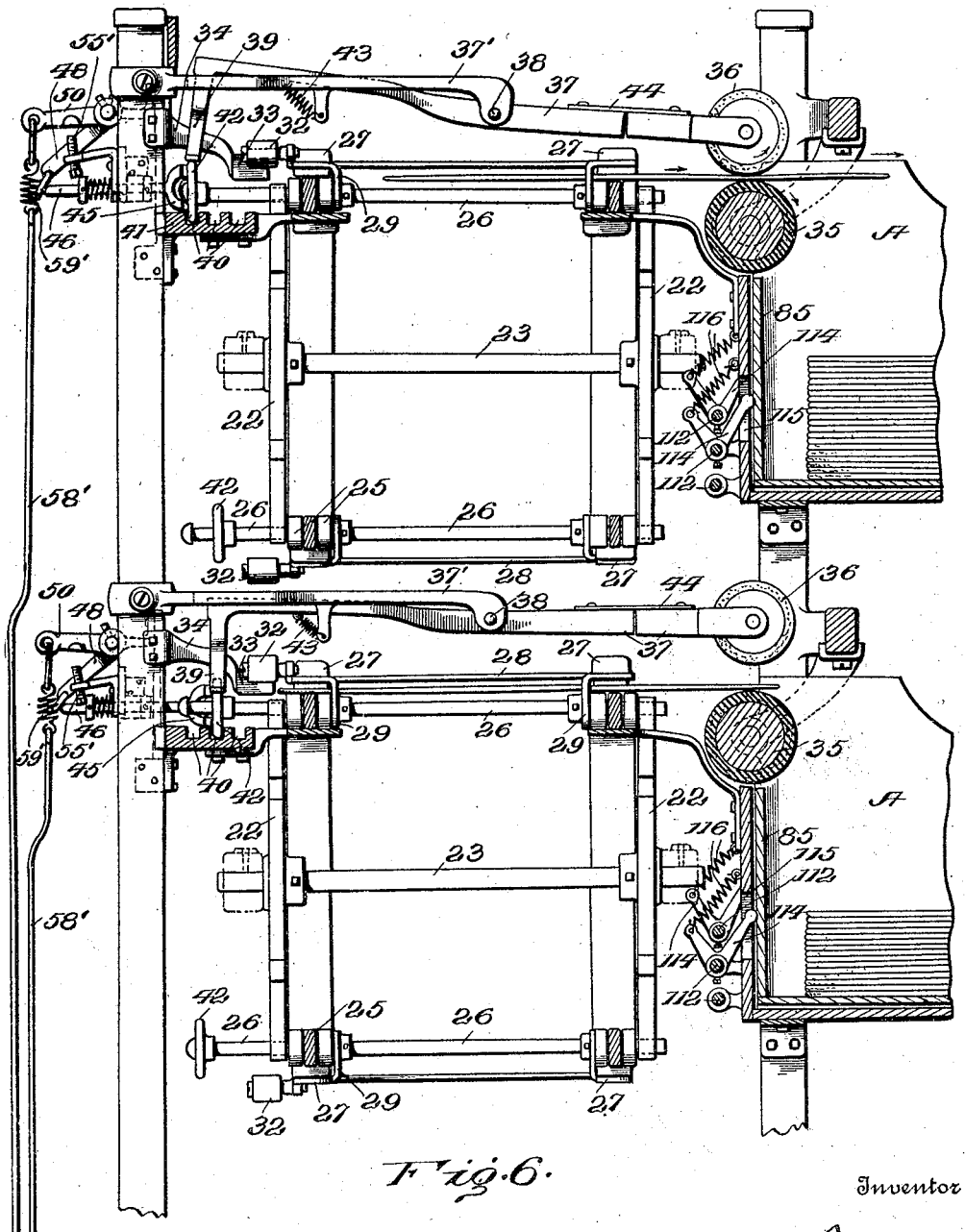
Fig. 6, is a vertical cross section through a portion of the apparatus taken in the line 6—6, Fig. 5.

Figs. 7, 8, and 9, are perspective views of details.

Fig. 10, is a perspective somewhat diagrammatically of the vertical main letter way and means for diverting letters therefrom.

Fig. 11, is a cross section on the line 11—11, Fig. 10.

Fig. 12, is a perspective of a detail.

Fig. 13, is a diagrammatical detail perspective of certain parts.

Fig. 14, is a detail perspective showing one of the letter box drawers reversed to drop the bundle of letters therefrom.

The letters to be distributed are faced up and placed in a feed way 1, to form a common pile at the common source. The bundle of letters is constantly fed or pressed forwardly in said way against any suitable front stop wall 2, by any suitable means, such as follower 3.

Any suitable initial feeder, such as reciprocatory feeder 4, successively moves the foremost letters from the feed way and delivers the same to any suitable printing mechanism for postmarking and stamp cancellation or the like. In the example illustrated, the printing mechanism comprises printing roll 5 and impression roll 6.

The printing mechanism successively receives the letters and successively delivers the same to a suitable inspection station, wherein each letter is held with its addressed face exposed to the view of the operator so that the operator can, on reading the address of the letter, set the devices predetermining the letter box to which said letter will be delivered, and also causing said letter to be removed and started on its travel to such box, and also causing another letter to be taken from the feed way and passed through the printing mechanism and delivered to said inspection station for distribution.

In the drawings, I show approximately the same feed way, initial feeder, and printing mechanism as disclosed and described in my said Patent No. 919,810, and I do not describe the same in detail herein as my present invention does not involve the details of such devices for initially handling or operating on the letters and delivering the same to the inspection station. The inspection station plate or support 8 is arranged at such an angle that the letters approximately assume the vertical position when located in front thereof with their addressed faces exposed.

The letters are supported at the inspection station by a vertically swingable plate 9, mounted to swing on transverse axis or pivot 10, and provided with suitable means to yieldingly uphold the lower free end or edge.

For instance, I show a spring 11, for yieldingly upholding the free end of the plate. The letters at the inspection station rest on the free end of this plate and are supported thereby. This plate forms the platform of a device for indicating the weight of the letters upheld thereby. The spring 11, is so arranged and proportioned as to co-operate with said plate 9, in forming a letter scale provided with a graduated plate 12, fixed to the adjacent frame work and a pointer 13, carried by the plate 9, and co-operating with the scale on plate 12, to indicate approximately the weight of the letter supported by the plate. This letter weighing device is designed to indicate to the operator all over weight letters so that he can take care to observe the amount of the postage stamps applied thereto, and can remove all letters not bearing postage stamps of sufficient amount.

The provision of means for weighing the letters before distribution thereof, constitutes a valuable adjunct, but I do not wish to limit other features of my invention to use in connection therewith.

Suitable means are provided for pushing each letter from the inspection station, past the scale platform 9, and to the distributing or sorting devices for delivery to a particular letter box. For instance, I show a pusher 14, for this purpose, operating simultaneously with the initial letter feeder as described and shown in my before mentioned patent.

In the specific example illustrated the letters are successively delivered from the inspection station to a vertically-disposed main letter way which distributes the letters to superimposed branch letter ways extending horizontally from said main letter way at different elevations.

The branch letter ways communicate with horizontally arranged superimposed rows of letter boxes, each branch way being arranged to supply letters to any box of a row.

The main letter way comprises vertical guide plates 15, fixed to the main frame and having transverse letter passages therethrough opposite the receiving end of each branch letter way. The letters are carried down the plates 15, by continually and rapidly rotating vertical endless friction belts 16, spaced apart laterally and mounted on suitable pulleys 17, at the upper and lower ends of the main way and having their inner vertical plies yieldingly held against the plates 15, by suitable spring presser feet 17ª, so that the belts will frictionally engage the letters and press them against said plates and carry the letters downwardly along the plates.

The lateral openings from the main letter way to the branch letter ways are closed for the movement of letters down the main way and past said openings, excepting the lower most branch opening, or one other branch opening if the particular letter is to be distributed to a branch way other than the lowermost branch way.

Guides or deflectors 18, are fixed at the lower end of the main letter way to deflect letters laterally therefrom to the lowermost branch letter way, delivering the letters in a horizontal position to the branch letter way. The upper openings to the branch letter ways are controlled by upwardly extending swinging fingers 19, adapted to bridge their openings and form letter slide ways thereacross, or to swing outwardly between the belts to intercept a letter moving down the main way and deflect the same laterally through the opening to the branch way. The lower ends of the fingers are formed with heels 20, to guide the letters and turn them from the vertical to the horizontal positions.

These pivotal fingers are fixed to and carried by rock shafts 21, arranged transversely of and mounted in the main frame.

The main letter way, letter-conveying friction belts, and letter deflecting gates or fingers, as so far mentioned, are disclosed and described in my before mentioned patent, and are disclosed herein merely as an example of means for delivering the letters to branch letter ways and my present invention is not limited thereto as various means can be employed for distributing the letters to the branch letter ways or to conveyers for carrying the letters to the boxes for delivery thereto.

In the specific example illustrated, I show each swinging gate finger 19, provided with a lateral lug 19', to engage the inner ply of an abjacent friction belt when the finger is swung outwardly to letter deflecting position.

Each branch letter way comprises or is provided with an endless letter distributing conveyer carrying or embodying letter holders or clamps uniformly distributed throughout the length of the conveyer and adapted to successively move into letter receiving position with respect to the main letter way.

Each letter distributing conveyer comprises opposite end sprocket wheels 22, carried by two transverse shafts 23, mounted in journal boxes carried by arms 24, rigid with the main frame. In the specific example illustrated, each sprocket wheel comprises two heads or disks spaced a distance apart and secured on the one shaft and having edge notches. The conveyer per se is composed of two parallel chains consisting of links 25, pivotally united by cross shafts or pins 26, extending transversely between and connecting the two chains and projecting outwardly from said links to fit the notches in the sprocket wheels with the links arranged between the two heads making up each sprocket.

Every alternate shaft or pivot 26, carries a letter gripping or clamping member mounted to swing thereon and extending rearwardly therefrom in the direction of movement of the conveyer and consisting of a pair of parallel flexible or spring fingers 27, connected by cross bar 28, and at their forward extremities having depending perforated ears 29, loosely mounted on a shaft 26, so that the flexible fingers 27, are arranged longitudinally of the conveyer and are normally held in letter gripping position yieldingly closed down on the outer longitudinal edges of links of the two chains, respectively, by spring 30, secured to the clamp and to an adjacent chain link.

Each clamp in rear of the shaft 26, on which it swings, is provided with an upwardly or outwardly projecting lug 31, carrying a laterally projecting stud or pin provided with anti-friction roller 32, projecting laterally beyond the vertical plane of the conveyer. These lateral projections (rollers 32) of the letter clamps are designed to elevate the clamps to opened or letter-receiving positions against the tension of their closing springs 30. The projections, such as rollers 32, are operated by cam track 33, to swing the clamps to open position and to hold the same in such position during a certain portion of the travel of the clamps. The fixed curved track 33, is carried by a bracket 34, fixed to the main frame and arranged at the letter receiving end of the conveyer adjacent to the main letter way so that said rollers of the clamps will successively engage and roll throughout the length of such track.

Each letter distributing conveyer has its letter receiving end located close to and immediately in rear of a lateral opening from the main letter way, so that the letter discharged rearwardly and horizontally from said opening will land on and transversely of the upper ply of the conveyer. The cam 33, is so arranged and located that as the clamps successively move upwardly in passing from the lower ply to the upper ply of the conveyer at the letter receiving end thereof, the laterally projecting roller of a clamp will ride up on the lower front end of the cam and travel longitudinally of the cam and thereby elevate the clamp. The conveyer is driven with a step by step motion.

Actuating mechanism is provided to move the conveyer at each stroke a distance approximately equal to spacing between the clamps and to bring the conveyer to rest between said strokes.

The conveyer is so arranged that at the completion of each stroke thereof, a clamp will be held by its lateral roller and the cam 33, in open letter-receiving position, see Fig. 2, behind the letter discharge opening from the main way. The letter from the main way shoots forwardly and horizontally onto the top edges of the conveyer chains beneath the upheld clamp and rests transversely of and on the conveyer.

On the next stroke of the conveyer, the roller of said clamp will move forwardly from the cam and the clamp will swing down onto the top face of the letter and grip the same down on and against the conveyer chains, while another clamp moves up to letter receiving position. The conveyer is comparatively narrow with respect to the width of the letters so that the clamps grip the letters approximately at end portions thereof with the opposite end portions of the letters projecting laterally from the clamps and beyond the conveyer.

The said superimposed letter distributing clamp carrying conveyers are arranged in rear of the horizontally disposed parallel letter boxes A. These letter boxes are arranged in superimposed horizontal rows, and the rows are spaced apart vertically. The boxes are carried by a suitable frame to form the complete case of boxes and this frame usually forms a part of the main frame of the distributing machine.

The boxes are so formed and arranged that the letters can be removed from the boxes through their front ends, and each box has a letter ingress opening at the upper portion of its rear end, this opening being usually provided by forming the boxes open at the top.

A letter distributing conveyer is provided for each horizontal row of boxes so that the conveyer travels horizontally in rear of each box of the row with the top ply of the conveyer arranged approximately on a level with the space above the open tops of the boxes. This conveyer is so arranged and operated that each operative movement of the conveyer will carry the letter clamps thereof the distance from the center of one box to the center of the next box, and so that when the conveyer comes to rest after each stroke or forward movement, a letter clamp thereof will be in operative letter delivering position behind each box of the row.

This same action and arrangement is provided for where there are several rows of letter boxes and several conveyers therefor, inasmuch as all of the conveyers are similar and simultaneously driven the same distances and stop and start simultaneously.

Suitable means are provided to snatch or remove the letters from the conveyer clamps and shoot them longitudinally or endwise into the boxes.

For instance, I show horizontal constantly-rotating letter-moving friction rollers 35, arranged between the conveyers and rows of boxes. Each roller 35, is arranged transversely across the upper portions of the rear ends of the boxes of a row, and parallel with the direction of movement of the adjacent conveyer and below the horizontal plane of movement of the letters carried by such conveyer. This constantly driven roll is arranged directly below the ends of the letters that project laterally from the conveyer and toward the boxes. So that the letters overlie and move longitudinally along said roll. Each roll is preferably provided with a soft or otherwise formed friction surface, and the roll for each row of boxes is rapidly rotated so that its upper surface moves in a direction away from the conveyer and toward the boxes. The ends of the letters carried by the conveyer normally lie loosely on and move freely and longitudinally along the top surface of said roll, until a letter arrives opposite the box to which previously set mechanism has predetermined its delivery, whereupon suitable means co-operate with said roll in causing the roll to take frictional hold of such letter and snatch the same from the clamp and shoot the same forwardly into the box.

Various devices can be provided for this purpose, although in the specific example illustrated, I show series of independent separately movable idler presser rolls 36, one for each box, arranged opposite the rear ends of the boxes and above the rolls 35, and normally elevated above operative position.

The projecting ends of the letters carried by a conveyer move along the roll 35 and below and normally out of contact with the idler presser rolls 36, until a letter arrives opposite the box to which it is to be delivered, whereupon, the idler presser roll 36, in rear of such box is caused to descend upon the letter and press the same against the rapidly rotating surface of the roll 35, so that said roll 35, takes frictional hold of the letter and moves the same forwardly and endwise into the letter box. The idler presser roll is pressed down on the letter and is thus held in operative position while the conveyer remains at rest and until the conveyer starts on another forward stroke or step.

The presser roll 36, for each box can be formed in several sections as shown which however act together as one roll and hence I refer to the same herein in the singular for convenience in description.

In the specific example illustrated, each presser roll 36, is mounted on a horizontal shaft parallel with the axis of the adjacent co-operating roll 35, and this shaft is carried by the front free end of a horizontally disposed lever 37, arranged over and a distance above the adjacent conveyer. Each lever 37, is mounted to rock vertically on a transverse fulcrum 38, located about mid way the length of the lever, with the rear end of the lever extending to a point beyond the conveyer, and there provided with a depending laterally extending finger or shoe 39, arranged beyond the outer edge of the upper ply of the conveyer opposite the conveyer edge adjacent to the boxes.

The shoe 39, of each lever 37, extends from the lever in the direction of movement of the upper ply of the conveyer and is arranged parallel with the conveyer. The shoes 39, of the levers 37, of a row or extending over a conveyer, are arranged in different vertical planes and at different distances from the adjacent conveyer edge, and are located respectively, over trackways or grooves 40, arranged longitudinally of the top face of a plate 41, fixed to the main frame. These grooves are parallel with each other and with the top ply of the conveyer and are arranged different distances from the conveyer. There is a track or groove 40, for each lever 37, and there is a lever 37, for each letter box in the row served by the conveyer, and each lever operating cam or shoe 39, is located over a certain groove 40, but not over the remaining grooves 40. In the specific example illustrated, the levers, are fulcrumed to and carried by brackets 37', secured to parts of the main frame, and extending laterally therefrom over and a distance above the conveyer.

The levers 37, and their rolls 36, and operating shoes 39, are (in the particular example illustrated) utilized as the means for selecting letters from certain clamps of the conveyer for delivery to certain boxes in the row served by such conveyer.

For instance, each letter conveying clamp of the conveyer is provided with a wheel or rolling disk 42, and each wheel 42, is adapted and adjustable to any one of the grooves 40. As each clamp moves from the letter receiving position, the wheel 42, corresponding to such clamp is moved laterally with respect to the conveyer to a position to enter the particular groove 40, overhung by the shoe 39, of the lever controlling the roll 36, belonging to the box into which it is desired said letter shall be delivered. When the letter arrives at a position in rear of said box, the wheel 42, of the clamp carrying said letter will travel under said particular shoe 39, and force the same upwardly and thereby rock the lever carrying said shoe in a direction to force the roll 36 of said lever down onto the letter and thereby cause the roller 35, to pull the letter from the clamp and shoot the same into the particular box desired. The wheel 42, will hold the roll 36, in operative position for a certain length of time, but will pass from under the shoe 39, before the next succeeding clamp of the conveyer arrives opposite the particular box, and thereby permit the lever and its roll 36, to return to normal position under the action of spring 43, before another letter passes under roll 36.

The levers are provided with springs 43, normally acting to hold the levers with their rolls 36, elevated in inoperative position.

The levers 37, are also formed or arranged to permit vertically yielding pressure of the rolls 36, on the letters on roller 35, to accommodate letters of different thickness or other inequalities. For instance, I show the front ends of the levers formed in two separate transverse sections united by plate springs 44, thereby permitting vertical yielding of one lever section with respect to the other, as will be readily understood by those skilled in the art.

In the example illustrated, I show the friction-roll-carrying lever-operating wheels 42, mounted on the extended ends of the transverse pivot shafts 26, of the conveyer, the shafts on which the letter clamps are mounted. The rolls are free to rotate on these shafts and are also adjustable longitudinally of said extended ends of the shafts. These extended shaft ends travel longitudinally thereof and over the plate 41, and the wheels are adjustable thereon to enter any one of the grooves 40.

Between the front end of the plate 41, and the station at which the letter clamps receive the letters, I provide means for moving the wheel 42, of each clamp as it leaves the letter receiving position, to the necessary point on its shaft to enter the certain groove 40, corresponding to a particular letter box to bring about delivery of such letter to said box.

In the particular example illustrated, the means for determining the positions of the wheels 42, of a branch conveyer and hence predetermining the particular boxes of a row to receive the letters, comprises a curved switch-like cam, arm, plate or pusher 45, usually slotted or bifurcated for the passage of the shaft ends and having a curved face to successively engage the vertical side faces of the wheels 42, and push and guide the same longitudinally of the shafts to the desired positions thereon. This cam 45 is carried by a horizontal slide rod 46, movable through a suitable guide 46', carried by the main frame and is yieldingly held by spring 47, at its limit of outward movement and abutting against the free end of a vertically rockable arm 48.

In the specific example illustrated, each horizontal row of boxes is made up of three boxes, and hence the selecting devices for the means serving letters to a row of three boxes, requires but three guides, grooves or tracks 40, (one for each box) and three levers 37, and their rolls 36, and shoes 39, and but one wheel 42 adjusting device 45, arranged in advance of the front open ends of guides 40. In rear of the rear ends of the guides 40, I provide a fixed cam surface 54, suitably supported from the main frame, to engage the inner side faces of the wheels 42, (after the clamps thereof have passed beyond the stations or points in their travel at or from which letters are delivered to the boxes) and push said wheels longitudinally of the shafts 26, and toward the outer ends thereof. The purpose of this device 54, is to successively return the wheels to their normal positions near the outer ends of shafts 26, after letters have been delivered from the clamps thereof and before said clamps are returned to the letter receiving position, so that the wheels 42, of all clamps will be correspondingly located when said clamps are at the letter receiving position, and when said wheels pass to the wheel setting device 45.

In the particular example illustrated, merely for purposes of explanation, the case of boxes comprises three horizontal rows of boxes, each row being made up of three boxes, and hence I show three similar horizontal conveyers provided with the clamps, and three constantly and rapidly rotating friction rollers 35.

Suitable actuating devices are provided for these various mechanisms. For instance, I show a constantly rotating main drive shaft 55, provided with a suitable rotating friction pulley 56, driving an endless friction belt 57, passing into driving engagement with friction pulleys 58, on the projected ends of the shafts of the three letter delivering friction rolls 35. This belt is so arranged with respect to pulleys 58, as to rotate all of the rollers 35, in the same direction and at a high rate of speed.

The three clamp-carrying conveyers are simultaneously and uniformly actuated with a step by step movement through actuating mechanism comprising a rotating eccentric 59, on the main drive shaft and having its eccentric strap connected to reciprocate a rack bar 60, moving through suitable guides carried by the main frame and constantly in mesh with pinions 61, loosely mounted on the sprocket-wheel-carrying shafts of the conveyers and operatively connected therewith through the medium of pawl and ratchet wheel connections 62, permitting the gears to rotate freely in one direction and to drive the conveyers a step or stroke when rotated in the opposite direction. By this arrangement it will be noted that the conveyer will be moved forward a step or stroke by the stroke or longitudinal movement of the rack bar in one direction, but will remain at rest during the return stroke or opposite longitudinal movement of the rack bar.

Merely for purposes of illustration and explanation, I have disclosed approximately the same key lever arrangement for manually determining the particular box to which each letter shall be delivered, as appears in my hereinbefore mentioned patent.

In the present illustration showing nine letter boxes, I provide nine key levers 64, one for each box, and I show these levers arranged and movable approximately as in said patent, so that when any key lever is forced back by the finger of the operator, the lug 65, thereof will move under the lever depressing bail 66, and the backward movement of the key lever will swing the upstanding bail 67, and thereby push down the trip-releasing push rod 69, through the medium of arm 68, to throw the feeder and key lever depressing mechanism in gear or operative connection with the machine driving power.

The bail 66 is yieldingly held to its limit of movement in one direction by spring 70. Said bail is operatively connected to the reciprocating initial feeder actuating rod 71, pivotally joined to and actuated by vertically swinging toe 72. This toe is periodically swung vertically by a rotary arm 73, to operate the initial feeder and connected elements and to depress the bail 66, to force down the manually moved or set key lever. The normally stationary arm 73, is loosely mounted beside and concentric with a continuously rotating ratchet wheel 74, and carries a pawl 75, adapted to engage said wheel and drive the arm around therewith. The pawl is moved to and from operative position with respect to said wheel by a slide 76, and this slide is controlled by the trip 77, operated by the hereinbefore described push rod 69. The normal position of the trip 77, is in the path of the slide and holding the slide supporting the pawl from engagement with said ratchet wheel. When the rod 69 is depressed, the trip is thereby moved from said slide and which thereupon drops and throws the pawl into operative engagement with the ratchet wheel to carry the arm 73, around with the wheel through a single revolution. As the arm completes one revolution, the trip, which has returned to normal position, again engages and lifts the slide to elevate the pawl and bring the arm to rest. When the arm makes its revolution, the toe is elevated to operate the initial feeder and depress the manually set key lever. The depression of the manually set key lever operates the means for setting the wheel 42, adjusting cam 45, and also the means for setting the main letter way gates.

In the specific example illustrated, there are two sets of movable gates or switches 19, and the three key levers representing boxes in the top row must each operate means to open the top gate to deflect letters into the top branch letter way, and each key lever of the three representing boxes in the second horizontal row must operate means to open the other movable gate of the main letter way, while the three key levers representing the boxes of the bottom or third row need not operate the main letter way gates inasmuch as letters for the bottom row boxes are deflected from the main letter way to the bottom conveyer as a matter of course. The top main way gate is swung open or set by a spring-held bail 78, operatively connected to the gate by a pull rod 79, and crank arm 80. The key levers representing the boxes of the top row have lugs 81, to swing the bail 78, to set said gate when any one of said levers is depressed by bail 66.

The second main way gate is correspondingly operated by a bail 78', connected by pull rod 79', and crank 80', and swung to set the gate by lugs 81', on the three key levers representing the boxes of the second row.

In the particular example illustrated, there are three cams 45, for setting the wheels 42, one for each clamp-carrying conveyer. The letters are delivered one at a time from main way to said conveyers, that is, at each stroke or step forward movement of the three conveyers, one letter is delivered to but one of said conveyers.

The operating devices for the cams 45, when at rest permit said cams to assume their normal positions at their limits of outward movement. The cams when in this position will permit the wheels 42, to enter the outermost guides or tracks 40 of the three series of guides, and these tracks correspond to three boxes, one of each row. The cams 54, at the rear ends of the conveyers successively move the wheels 42, to their normal positions to enter the front ends of the outermost guides as the clamps move from their letter receiving positions.

The cams 45, are not set or moved by the key levers when letters are to be deposited in boxes corresponding to the outer most grooves 40, as the wheels 42, are all automatically returned to their normal positions by the devices 54, that is, to positions to enter outermost grooves 40. Hence the cams 45, only act on the wheels 42, of those conveyers carrying letters for deposit in boxes other than the boxes represented by the outermost grooves 40. The key levers representing the letter boxes corresponding to the outermost guides 40, do not operate means to move the cams 45, but the key levers representing all other boxes must operate means to move the cams 45, either to direct the wheels 42, into the middle guides 40, or into the innermost guides 40.

Various means can be provided for moving the cams 45, to various positions through the medium of certain key levers and operative connections. For instance, in the particular example illustrated, a cam 45, is moved to enter the middle and inner grooves 40, of its row by the arm 48, rigid with a horizontally disposed rock shaft 49, suitably mounted in journal boxes fixed to the main frame. This shaft is rocked a certain distance to move the cam 45, to guide a wheel 42, to the middle groove 40, and is rocked a greater distance to move the cam 45, its full inward stroke to guide a wheel into the innermost groove 40.

I show a pair of vertically rockable arms 50, 51, centered and loose on the rock shaft 49, and each connected to operatively rock said shaft through the medium of radial pins 52, rigid with and projecting from the shaft and lateral shoulders 53, rigid with the arm hubs. The arrangement is such that when either arm 50, 51, is rocked downwardly, the shaft 49, will be rocked therewith by the engagement of the arm shoulder 53, with the shaft pin 52, but the shaft pin 52, of the other arm will move away from the shoulder 53, of said arm, and hence the said other arm will remain at rest and will not be swung by the rocking movement of the shaft. In order to limit the downward swing of one of the arms 50, 51, so that the operative stroke thereof will carry the cam 45, only half a stroke so as to guide a wheel 42, into the middle groove 40, I provide a stop. To this end, I show an arm 54', fixed to the main frame and provided with an adjustable stop screw 55', arranged under the arm 50, for instance, to limit the downward swing thereof. Hence, the arm 50, will constitute a part of the selecting device for causing the delivery of letters to the box represented by the middle groove 40, while the arm 51, will constitute a part of the selecting device for causing delivery of letters to the box represented by the innermost groove 40, of a row.

In the specific example illustrated, where three rows of boxes, with three boxes in a row, are employed, there will be three shafts 49, and two arms 50, 51, on each shaft, and I can operatively connect each arm with a separate key lever so that on the depression of a key lever corresponding to a box represented by a middle or inner-most groove, but one arm 50, or 51, will be swung down, the other five arms remaining at rest. For instance, I show each arm operatively connected with a vertically swinging bail 56', corresponding thereto and arranged to be engaged and swung down by a lug 57', on one key lever. Hence, in this example there are six independent bails 56', and six key levers each having a lug 57', to engage and depress but one of said bails while the three remaining key levers are not provided with lugs 57', and do not operate bails 56', as said three key levers direct letters to the three boxes represented by the three outermost grooves 40.

Each bail 56', is operatively connected with the appropriate arm 50, or 51, through the medium of certain lever and bell crank connections 58ª, to and actuating an upwardly extending pull connection 58' designed to pull down on arm 50 or 51, when the bail is depressed by its key lever. As all the key levers move down approximately the same distance on their operative strokes, the pull rods or connections 58', coupled to the arms 50, include coiled contraction springs 59', adapted on an operative stroke of the parts, to expand and permit the pull rods 58', connected thereto to move down full strokes with its respective key lever when the arm 50, engages its stop 55', as will be readily understood by those skilled in the art.

At each operation of the machine, the initial feeder takes a letter from the common pile, common hopper, or feed way, and deposits the same at the inspection station, and simultaneously the pusher forces the previously fed letter from the inspection station and delivers the same to the main letter way from which it is delivered to the clamp carrying conveyer serving the row of boxes in one of which the letter belongs.

In operating the apparatus, the operator examines the address of the letter exposed at the inspection station, and, according to the distributing "scheme" he is following, thereupon knows how the letter must be routed and hence the particular box in which letters so routed must be deposited. He then presses back the key lever representing such particular box. This movement of the key lever throws the initial feeder operating and key lever depressing mechanism in gear with the driving means to depress the key lever and thereby set the particular main way gate, if the particular letter belongs in a conveyer above the bottom conveyer.

If this particular key corresponds to a box represented by an outermost groove 40, no bail 56', is operated, but if not, the depression of the key lever swings the bail 56', corresponding to said key lever and thereby depresses an arm 50, or 51, to set the cam 45, of the row containing the designated box, in position to guide the wheel 42, of the clamp carrying the particular letter to the middle or innermost groove 40, of said row representing the designated box. If the particular key lever depressed corresponds to a box represented by the innermost groove of the particular row, an arm 51, will be swung down a full stroke and the cam 45, corresponding thereto will be pressed inwardly a full stroke.

If the particular key lever depressed corresponds to a box represented by a middle groove of the row, an arm 50, will be depressed against its stop 55', and its pull connection will continue a full stroke by the stretching of the spring connection 59', and the particular cam 45, will move in the necessary partial stroke to guide the wheel 42, of the clamp carrying the particular letter into the middle groove 40, of said row.

After these selecting devices have been set, the pusher forces the letter from the inspection station and delivers the same to the main way conveyer and the initial feeder deposits another letter at the inspection station, and the apparatus is ready for another operation in delivering the last named letter to the proper conveyer.

The various letter handling mechanisms and their actuating means are so arranged and timed in their relative movements, as to assure the presence of letter receiving clamps of the conveyers at rest and in position to receive letters from the main letter way, at each letter moving stroke of the pusher moving a letter from the inspection station into the grasp of the main letter way conveyer. As soon as a letter has been delivered to a clamp-carrying conveyer, all of said conveyers move forward a stroke or step, to close their open clamps, and to open and present the next succeeding clamps at the letter receiving position, and to bring the clamps just closed and moved from such position into operative relation with respect to the cams 45.

The depression of a key lever causes delivery of the letter corresponding to said lever to the main letter way, and also selects the particular clamp carrying conveyer to which said letter is delivered from said way, and also selects the box in the row served by said conveyer to which said letter is delivered from the conveyer.

In the particular example illustrated, at each stroke or step movement of all the conveyers but one letter is delivered from the main letter way, and this letter goes to one of said conveyers. However, at each forward step of the conveyers several letters may be delivered from any one or several of said conveyers to the boxes.

If so desired, a key lever lock can be provided to prevent operative depression of a key lever, until the letter previously delivered to the main letter way has been received by a conveyer clamp, so that a forward step movement of the conveyers will always intervene between the delivery of successive letters from the inspection station to the main letter way conveyer. For instance, approximately such a key lever lock as disclosed by my hereinbefore mentioned patent might be employed.

In order to time the step by step movements of the branch letter way conveyers with the means feeding letters thereto so that said conveyers will be at rest in letter receiving position when the main conveyer delivers letters thereto, I preferably employ means whereby said conveyers are periodically actuated rather than continuously driven. To this end, I can arrange a continuously rotating ratchet wheel 74ᵃ, on the shaft 55. I also arrange a normally stationary arm 73ᵃ, loose on said shaft and provide this arm with a hub rigid therewith and forming or carrying the normally stationary eccentric 59, hereinbefore described for actuating said conveyers. The arm 73ᵃ, carries a pivoted pawl or dog 75ᵃ, normally held from engagement with the teeth of the ratchet wheel by a slide 76ᵃ, carried by and movable longitudinally of the arm and provided with a spring constantly tending to move the slide in a direction to throw the dog into operative engagement with the ratchet wheel.

The lowered beveled end of this slide extends below the arm and is adapted to engage a swinging trip 77ᵃ. This trip is provided with suitable operating connections whereby the two trips 77, 77ᵃ, are simultaneously actuated so that when trip 77, is swung to release slide 76, the trip 77ᵃ, will also be swung to release slide 76ᵃ. This result can be accomplished by mounting trip 77ᵃ, on the same rock shaft 75', with trip 77. These two make and break mechanisms are approximately similar in construction and operation, and are also approximately the same in construction and operation as the make and break mechanism illustrated more in detail in my hereinbefore mentioned Patent No. 919,810.

The ratchet wheel 74 can be geared to and continuously rotated from the shaft 55, through the medium of shaft 55ᵇ, and appropriate gearing.

When the trip 77, is swung to cause a single operating stroke of arm 75, the trip 77ᵃ, will also be swung to throw the arm 73ᵃ, into operative connection with its driving wheel 74ᵃ, and said arm 73ᵃ, will then make a complete revolution and through the eccentric 59, and rack 60, will move all the clamp bearing conveyers one step forward. The arm 73ᵃ, on making one complete revolution, will be brought to rest by the engagement of the slide 76ᵃ, with trip 77ᵃ, and the consequent upward movement of the slide to lift pawl 75ᵃ, from wheel 74ᵃ.

In the particular example illustrated, the constantly rotating friction rollers 35, under the co-operating action of idler rolls 36, shoot the letters endwise through the rear ends of the letter boxes and longitudinally therein toward the front or egress ends thereof. Hence, it is desirable to provide means for normally closing the front letter egress ends of these letter boxes. For this purpose, I provide the letter boxes with removable sliding drawers 85, open at their tops and having front end walls to close the egress ends of the boxes. These drawers snugly and removably fit the boxes and are readily removed therefrom and inserted therein. The letters discharged into the boxes are received by the drawers therein. When a box is full, its drawer can be readily slipped therefrom carrying the pile of letters. The drawer can be reversed (see Fig. 14) to discharge the letters therefrom alined in a pile.

If so desired, each drawer can have a bottom hole or slot 86, for the insertion of the hand or fingers to aid or facilitate in discharging the letters from the drawer in a stack or pile for packaging.

I have used the term "letters" herein in a broad or generic sense to include any articles or matter which the apparatus of my invention is adapted to handle.

It is evident that various changes, and modifications might be resorted to, that elements and combinations might be added, and that elements and combinations disclosed might be omitted, without departing from the spirit and scope of my invention, and hence I do not wish to limit myself to the disclosure hereof.

What I claim is:—

1. Mail distributing apparatus, in combination with mechanism for individually weighing the pieces of mail matter and indicating the weight thereof.

2. Mail distributing apparatus comprising a way for the common pile of mail matter to be distributed and conveying and sorting mechanism, in combination with letter weighing mechanism receiving the letters individually after they have passed from the common way and before they are delivered to the sorting mechanism.

3. Mail distributing mechanism provided with means to visually indicate the weight of each piece of mail matter, said means being included in and as a part of said mechanism.

4. Mail distributing apparatus comprising a common way to receive the pile of letters to be distributed, sorting mechanism, letter moving means, and an inspection station successively receiving the letters on their their passage from said way to said sorting mechanism, said inspection station embodying letter weighing and indicating means.

5. Mail distributing apparatus comprising a letter passage way, parallel spaced flexible friction belts for propelling letters along said way, and a swinging fingered gate for deflecting letters from said way, the fingers of said gate having lateral lugs to engage said belts as the gate swings to letter deflecting position, substantially as described.

6. A distributing case of receptacles, in combination with letter sorting mechanism at the exterior of said case, letter conveying devices at the exterior of said case and arranged to carry the letters in horizontal positions behind said case and the receptacles thereof, and selecting means to grasp the letters and shoot them endwise and forwardly from said devices and into said receptacles, said means being controlled by said sorting mechanism.

7. A distributing case comprising a horizontal row of receptacles, in combination with a continuously rotating roll common to said receptacles, a series of rolls corresponding to said receptacles and normally in inoperative position with respect to said common roll, means to carry letters along said row of receptacles and overlying said common roll, and sorting mechanism controlling said series of rolls and whereby any roll thereof can be selected and caused to move into operative relation with respect to said common roll to grasp the letter selected and to discharge the same into a predetermined receptacle.

8. A row of receptacles, in combination with a continuously rotating letter moving roll arranged adjacent to all of said receptacles, means for moving the letters longitudinally along said roll, means for bringing any letter into operative contact with said roll for discharging the letter into a predetermined receptacle, and sorting mechanism whereby the receptacle into which each letter is to be delivered is predetermined.

9. A row of receptacles, in combination with a letter conveyer movable longitudinally of said row and comprising letter clamps individually carrying the letters, normally inoperative means for grasping any letter carried by said clamp and removing the same therefrom and discharging the letter into a predetermined receptacle of said row, and sorting mechanism whereby said means are controlled and the particular receptacle to which each letter is to be delivered is predetermined.

10. A mail distributing apparatus comprising an endless conveyer embodying letter holding clamps, means for moving said conveyer step by step, and sorting mechanism whereby the point at which each letter will be discharged from its clamp is predetermined embodying means to pull letters from said clamps.

11. Distributing apparatus for conveying units from a common source and distributing them to various selected discharge stations comprising a series of clamps, means for moving said clamps in a circuit, each clamp constructed and arranged to carry a unit flatwise or in a horizontal position, means at each station for causing discharge of the unit carried by any clamp, and selective devices moving with said clamps, substantially as described.

12. In a mail distributing apparatus, in combination, an endless letter conveyer, operating means for moving the conveyer with a step by step movement from the letter receiving point past a series of letter delivery points, means carried by said conveyer for causing delivery of letters therefrom at predetermined points, said means acting to cause letter delivery by the forward movement of said conveyer, letter delivery devices operated by said means, and sorting mechanism whereby said means are controlled to predetermine the delivery points of the letters received by said conveyer.

13. In mail distributing apparatus, in combination, an endless conveyer provided with a series of individual letter holders, means for successively opening said holders when at the letter receiving position, operating means for said conveyer to bring said holders successively to the letter receiving position, means for delivering letters to said holders, a series of means arranged along the path of said conveyer for delivering the letters from the holders thereof, said series of means being normally inoperative for removing letters, and devices whereby the means of said series are operated to cause delivery of letters from said holders and whereby the delivery point of each letter is predetermined.

14. In a mail distributing apparatus, in combination, an endless letter conveyer comprising a series of letter holders, means for successively opening said holders at the letter receiving position, means for closing said holders to grasp the letters, a series of means arranged along the path of said conveyer for removing the letters from the holders and discharging the letters at predetermined points of delivery, and selecting devices for operating said means and predetermining the point of delivery of each letter.

15. In a mail distributing apparatus, in combination, series of devices for delivering letters at predetermined points of delivery, said devices being normally out of letter delivering position, a letter conveyer movable along said devices and carrying a series of means for operating and whereby any one of said devices can be moved to cause delivery of a letter from said conveyer and at a predetermined point, means for successively delivering letters to said conveyer, and sorting mechanism whereby said series of means can be operated to cause delivery of each letter at a predetermined point.

16. In mail distributing apparatus, in combination, an endless letter conveyer, a series of devices arranged along the path of said conveyer for causing delivery of letters therefrom at predetermined points, a series of selective means carried by said conveyer for operating said devices to cause delivery of each letter at a predetermined point, and keyboard controlled means whereby said selective means are operated to predetermine the delivery point of each letter delivered to said conveyer, said selective means positively operating the delivery devices of said first series by the forward movement of said conveyer.

17. In combination, a plurality of unit carriers for delivering units at a plurality of discharge stations; a plurality of settable selective devices corresponding to said carriers; setting up mechanism for and common to said devices; a plurality of unit discharge means corresponding to said plurality of unit discharge stations; feeding means for delivering units to said carriers; a keyboard controlling said setting up mechanism and said feeding means; and means for advancing said carriers in an endless circuit, and for advancing said selective devices in unison with said carriers; each unit discharge means being operatively movable to and from normal and operative letter discharging positions and constructed and arranged when in operative position to directly engage the unit in the carrier at the selected discharge station and cause discharge thereof to said station, said plurality of unit discharge means having relative distinctive operating portions; each selective device adapted to be set up to engage the operating portion of the unit discharge means of the selected station and move said means to discharging position to engage and cause discharge of the unit from the carrier of said set up selective device.

18. In a mail distributing apparatus, in combination, an endless conveyer carrying a series of normally closed letter holders, means for successively opening said holders at the letter receiving position, means for normally maintaining said holders in closed position, each holder having a movable selective device, means for moving said selective devices to various positions to predetermine the delivery point of each letter from its holder, a series of letter discharging devices arranged along said conveyer and controlled by said selective devices to cause discharge of the letters from the holders at predetermined points, and manually controlled means for setting said selective devices.

19. In a mail distributing apparatus, in combination, horizontal series of letter receptacles, superimposed horizontal series of endless letter conveyers, each row of receptacles having a conveyer corresponding thereto and adapted to discharge letters to any receptacle thereof, each row of receptacles having a series of letter discharge means for discharging letters from the conveyer of said receptacles to any receptacle of said row, said letter discharge means being normally inoperative with respect to the letters carried by said conveyers, series of selective means carried by said conveyers and each adapted to be set to operate any letter discharge means of the row of receptacles served by a conveyer to cause discharge of a particular letter from said conveyer to a particular receptacle of said row, manually controlled means for setting said selective means, and mechanism for delivering letters to said conveyers and predetermining the conveyer to which each letter shall be delivered.

20. In combination, in mail distributing apparatus, a row of letter receptacles, a letter conveyer along which said receptacles are arranged, said conveyer comprising a series of letter holders, means to deliver letters to said holders, a series of letter discharge means corresponding to said receptacles, respectively, and adapted to take letters from said holders and deliver the same into said receptacles, each letter discharge means being normally inactive with respect to the letters in said holders and adapted to deliver letters from any holder to a particular receptacle when said holder reaches letter delivery position with respect to said receptacle, said conveyer provided with a series of selective devices corresponding to said holders, respectively, each selective device capable of being set to operate any one of said discharge means to cause discharge of the letter from the holder represented by said selective device into the receptacle represented by said discharge means, and a series of manually controlled levers provided with operative connections whereby each key lever can cause the setting of a selective device to predetermine the delivery points of the letters delivered to said conveyer.

21. In mail distributing apparatus, in combination, an endless conveyer having a series of letter holders, a series of selective devicees corresponding to said holders, respectively, and carried by said conveyer, each device being independently adjustable laterally to various positions, means for successively returning said devices to normal position, manually controlled means for successively adjusting said devices to different positions to predetermine the delivery points of the letters carried by said holders, and a series of independent letter discharging devices arranged along said conveyer for causing discharge of letters from said holders, said letter discharging devices being controlled by said selective devices, respectively, according to the adjustment thereof.

22. In mail distributing apparatus, a series of receptacles, a series of normally-inoperative letter discharging devices corresponding to said receptacles, respectively, each device being arranged to discharge letters to a certain receptacle and having an operating portion differently arranged from the operating portions of the remaining devices, a letter conveyer adapted to carry letters along said series of discharging devices, a series of independently adjustable selective devices carried by said conveyer and each capable of being adjusted to operatively engage the operating portion of any letter discharging device and to avoid the operating portions of the remaining devices, means to successively return all of said selective devices to normal position, and manually controlled mechanisms, for setting said selective devices.

23. In combination, in mail distributing apparatus, a series of letter receptacles, a letter conveyer movable along said series of receptacles and provided with a series of letter holders, a series of normally-inactive letter discharging devices adapted to take the letters from said holders and deliver the same to said receptacles, each device delivering to a certain receptacle, each device provided with an operating portion whereby said discharging device can be brought to operative position to remove a letter from a holder and discharge the same into its receptacle, the operating portions of the several devices being arranged out of line with each other, a series of laterally adjustable operating-portion-operating wheels carried by said conveyer and corresponding to said holders, respectively, and manually controlled means whereby said wheels can be successively adjusted laterally to positions to operate certain letter discharge devices and thereby predetermine the particular receptacles to which the letters will be delivered.

24. In combination, in mail distributing apparatus, a series of receptacles, a series of normally-inoperative letter propelling rolls corresponding thereto, respectively, and adapted to be independently brought into operative relation to discharge a letter into any receptacle, the set of rolls for each receptacle being provided with independent means for bringing the same into operative letter propelling relation comprising an operating portion differently arranged from the corresponding portions of the remaining sets of rolls, means for moving letters along said sets of letter propelling rolls and in position to be grasped by any set of rolls brought to operative position, and manually controlled means for predetermining the particular receptacle to which each letter will be delivered.

25. In combination, in mail distributing apparatus, a series of receptacles, a series of manually controlled levers, corresponding thereto, a letter conveyer having a series of letter holders, a series of normally-inoperative means corresponding to said receptacles and adapted to deliver letters from said holders to said receptacles, each holder provided with a laterally adjustable selective device selecting and actuating the particular means to take the letter from the holder thereof and deliver the same to a particular receptacle, letter moving means for successively delivering letters to said holders, and mechanisms controlled by said key levers whereby the operative movement of a key lever causes the delivery of a letter to a holder of the conveyer and the adjustment of the selective device of said holder to predetermine the receptacle to which said letter will be delivered.

26. In combination, in mail distributing apparatus, a letter conveyer provided with a series of laterally adjustable wheels determining the delivery points of the letters from the conveyer, a wheel adjusting device movable to various points and common to all of said wheels, a series of manually controlled levers, and operating mechanisms therefrom to said adjusting device to determine the position to which the same shall be moved.

27. In combination, in a mail distributing apparatus, an endless conveyer having a step by step movement and provided with a series of letter holders, a series of independent means for discharging the letters from said holders, selecting means whereby the particular means for taking a letter from a particular holder is predetermined, said selecting means comprising a series of selective elements carried by said conveyer and corresponding to said holders, respectively, a series of runways arranged side by side, said elements being laterally adjustable to travel in any one of said runways, a laterally adjustable device to successively guide said elements to enter any one of said runways, a series of manually controlled levers, and operative connections from said levers to move said device to different positions to predetermine the delivery points of the letters from said conveyer.

28. In combination, in mail distributing apparatus, several superimposed rows of letter receptacles, superimposed endless letter conveyers corresponding thereto, respectively, and each provided with a series of letter holders, means for simultaneously moving said conveyers forward with a step by step movement to successively bring the holders thereof to the letter receiving positions, a main letter conveyer common to all of said endless letter conveyers and adapted to successively deliver letters to the holders thereof, means determining the endless conveyer to which each letter will be delivered from the main letter conveyer, series of letter discharge means between the endless conveyers and the rows of receptacles for discharging letters from said conveyers into said receptacles, a separate and independent letter discharge means being provided for each receptacle, and manually controlled means selecting the particular letter discharge means to discharge each letter and thereby predetermining the receptacle of a row to which each letter will be delivered.

29. In combination; a succession of carriers for conveying articles to be distributed to a plurality of discharge stations; keyboard controlled feeding means for delivering articles to said carriers; a succession of settable selective devices corresponding to said carriers and moving in unison therewith; keyboard-controlled setting up mechanism for said selective devices; and a plurality of normally inoperative article discharging means corresponding to said discharge stations and each constructed to be moved by a distinctively set selective device to directly engage the article of the carrier of such selective device and cause positive discharge thereof from the carrier to the selected discharge station.

30. Distributing apparatus for conveying units from a common source and distributing them to various selcted discharge stations, comprising an endless conveyer provided with a series of gripping devices each constructed and arranged to hold and carry a unit, means for feeding units one by one to said gripping devices, discharge devices arranged adjacent to said stations, respectively, and each arranged to forcibly discharge a unit from a gripping device, and selective means carried by said conveyer, one for each gripping device, and arranged to positively throw said discharge devices into action by the forward movement of said conveyer.

31. In distributing apparatus, in combination, a series of article-discharging devices at the different points of destination, each discharging device provided with operating means, said operating means being relatively distinctive, an endless conveyer common to all of said discharging devices and provided with a plurality of similar selective elements, each movable to various set ups and carried by an axis moving with said conveyer, setting up mechanism common to all of said elements, key board controlled means for said setting up mechanism, and means for returning said selective elements to normal position.

32. Distributing apparatus for conveying units to and discharging them at various discharge stations, comprising a conveyer, keyboard-controlled means for delivering units to the conveyer for distribution, a series of keyboard controlled selective devices moving with said conveyer and controlling and predeterming the points of discharge of the units from the conveyer, and a series of runways for said selective devices arranged side by side and longitudinally of the conveyer and fixed with respect thereto, said selective devices being movable transversely of the conveyer to attain various set ups and select the runways in which they will travel.

33. Distributing apparatus for displaying the addresses of mail units for reading by the operator and for conveying such units to and delivering them at various discharge stations according to the addresses of such units, said apparatus comprising a series of mail unit carriers movable in a circuit past various discharge stations, a keyboard-controlled feeder for causing delivery of mail units to said carriers, and a series of keyboard-controlled selective devices movable in a circuit in timed relation to the movement of said carriers and predetermining and controlling the points of discharge of the units from the carriers, said selective devices being movable transversely of the direction of forward movement of said series of devices to any one of several positions, to attain various selective set ups.

34. Distributing apparatus comprising a series of carriers movable in a circuit past a series of discharge stations for conveying units and distributing the same to such stations, keyboard-controlled feeding mechanism for delivering units to such carriers, a series of selective devices movable with said carriers, for predetermining and controlling the points at which the units will be discharged from the carriers, each carrier being provided with a selective device movable laterally with respect to the path of movement of the carrier to various positions to attain any set up necessary to cause discharge of the unit in said carrier at any one of said discharge stations, and keyboard-controlled setting up mechanism common to the selective devices of said carriers and embodying laterally movable means to successively shift said selective devices laterally to various set ups.

35. Distributing apparatus comprising a series of carriers movable in a circuit past a series of discharge stations. Keyboard-controlled means for delivering units to be distributed one at a time to said carriers respectively, selective devices for said carriers respectively, and movable forward therewith, each selective device controlling and predetermining the point at which the unit will be discharged from its carrier, setting up mechanism for said selective devices embodying a single member movable to various positions, and a series of independent controlling elements operatively connected to said one member.

36. Distributing apparatus comprising conveying means for transporting units to be distributed and discharging them at various predetermined discharge stations, mechanism for successively delivering units to be distributed to said conveying means, selective devices movable with said conveying means and controlling the points at which the units are discharged from said conveying means, each selective device embodying a member shiftable to various operative positions transversely of the direction of movement of said devices to attain various selective set ups, and keyboard controlling means for said mechanism for delivering the units and for said selective devices.

37. Distributing apparatus comprising conveying means for transporting units to be distributed and discharging them at selected discharge stations, feeding means for delivering units one at a time to said conveying means, a series of selective devices controlling and predetermining the points at which the units are discharged, setting up mechanism for said selective devices embodying a movable member, and a keyboard controlling said feeding means and said setting up mechanism and embodying several independently movable controlling elements operatively connected with said movable member to shift the same to various positions.

38. Distributing apparatus for conveying units from a common source and distributing them to selected discharge stations, said apparatus being characterized by a keyboard controlled feeder, a series of selective devices for controlling the distribution of said units, and keyboard controlled mechanism for setting up said devices to predetermine the station at which each unit is to be discharged, each device embodying a member movable by said setting up mechanism to two or more different operative positions in attaining various set ups.

39. In distributing apparatus, in combination, a series of individual carriers movable in a circuit in a vertical plane past a series of unit receptacles for separately conveying units and distributing the same to said receptacles, said receptacles being arranged longitudinally of said circuit and arranged in a vertical plane located laterally to one side of said circuit, a series of selective devices movable with said carriers for predetermining and controlling the points at which the units will be discharged, each carrier being provided with a selective device movable to attain any set up necessary to cause discharge of the unit from such carrier to any one of said receptacles, means for causing discharge of units laterally from the carriers to said receptacles, and setting up mechanism common to the selective devices and embodying movable means to shift the selective devices to attain various set ups.

40. Distributing apparatus comprising a series of carriers movable in a circuit past a series of discharge stations for conveying units and distributing the same to such stations, key-board-controlled means for delivering units to said carriers, a series of selective devices movable with said carriers, for predetermining and controlling the points at which the units will be discharged from the carriers, each carrier being provided with a selective device movable laterally with respect to the path of movement of the carrier to various positions to attain any set up necessary to cause discharge of the unit in said carrier at any one of several discharge stations, and key-board-controlled setting up mechanism common to the selective devices of said carriers and embodying movable means to shift said selective devices laterally to various set ups.

41. In combination; a succession of carriers for conveying articles to be distributed to a plurality of discharge stations; keyboard controlled feeding means for delivering articles to said carriers; a succession of settable selective devices corresponding to said carriers and moving in unison therewith; keyboard-controlled setting up mechanism for said selective devices; a plurality of normally inoperative article discharging means corresponding to said discharge stations and each constructed to be moved by a distinctively set selective device to directly engage the article of the carrier of such selective device and cause positive discharge thereof from the carrier to the selected discharge station; and driven means co-operating with said discharging means to force the article discharge.

42. In combination; a succession of carriers for conveying articles to be distributed to a plurality of discharge stations; keyboard controlled feeding means for delivering articles to said carriers; a succession of settable selective devices corresponding to said carriers and moving in unison therewith; keyboard-controlled setting up mechanism for said selective devices; a plurality of normally inoperative article discharging means corresponding to said discharge stations and each constructed to be moved by a distinctively set selective device to directly engage the article of the carrier of such selective device and cause positive discharge thereof from the carrier to the selected discharge station; and driven means co-operating with said discharging means to force the article discharge laterally from the carrier and transversely to the direction of forward movement of the carrier.

43. In combination; a succession of carriers for conveying articles to be distributed to a plurality of discharge stations; each carrier constructed and arranged to propel a unit in a flat-wise position approximately parallel to the direction of forward movement; keyboard controlled feeding means for delivering articles to said carriers; a succession of settable selective devices corresponding to said carriers and moving in unison therewith; keyboard-controlled setting up mechanism for said selective devices; and a plurality of normally inoperative article discharging means corresponding to said discharge stations and each constructed to be moved by a distinctively set selective device to directly engage the article of the carrier of such selective device and cause positive discharge thereof from the carrier to the selected discharge station.

44. Distributing apparatus for conveying units from a common source and distributing them to various selected discharge stations; said apparatus embodying a series of carriers, each constructed and arranged to propel a unit while in a flatwise position approximately parallel with the direction of travel of the carrier; means to propel such carriers in a circuit past a series of discharge stations; a series of relatively-distinctive unit discharge means corresponding to said discharge stations and arranged along said circuit and each adapted to be brought into direct discharging contact with units propelled by the carriers and constructed and arranged to be normally inoperative with respect to the units propelled by said carriers; a series of settable selective devices corresponding to said carriers and driven in a circuit in unison therewith and each adapted to be set up to select anyone of said discharge means and cooperate therewith in bringing the selected discharge means into direct operative engagement with the unit of the carrier of said set up selective device to thereby cause discharge of said unit at the selected discharge station; and keyboard controlled setting up mechanism for said selective devices.

In testimony whereof I affix my signature in presence of two witnesses.

WILLIAM BARRY.

Witnesses:
ALICE A. O'BRIEN,
B. C. TURNER.